Patented Mar. 9, 1943

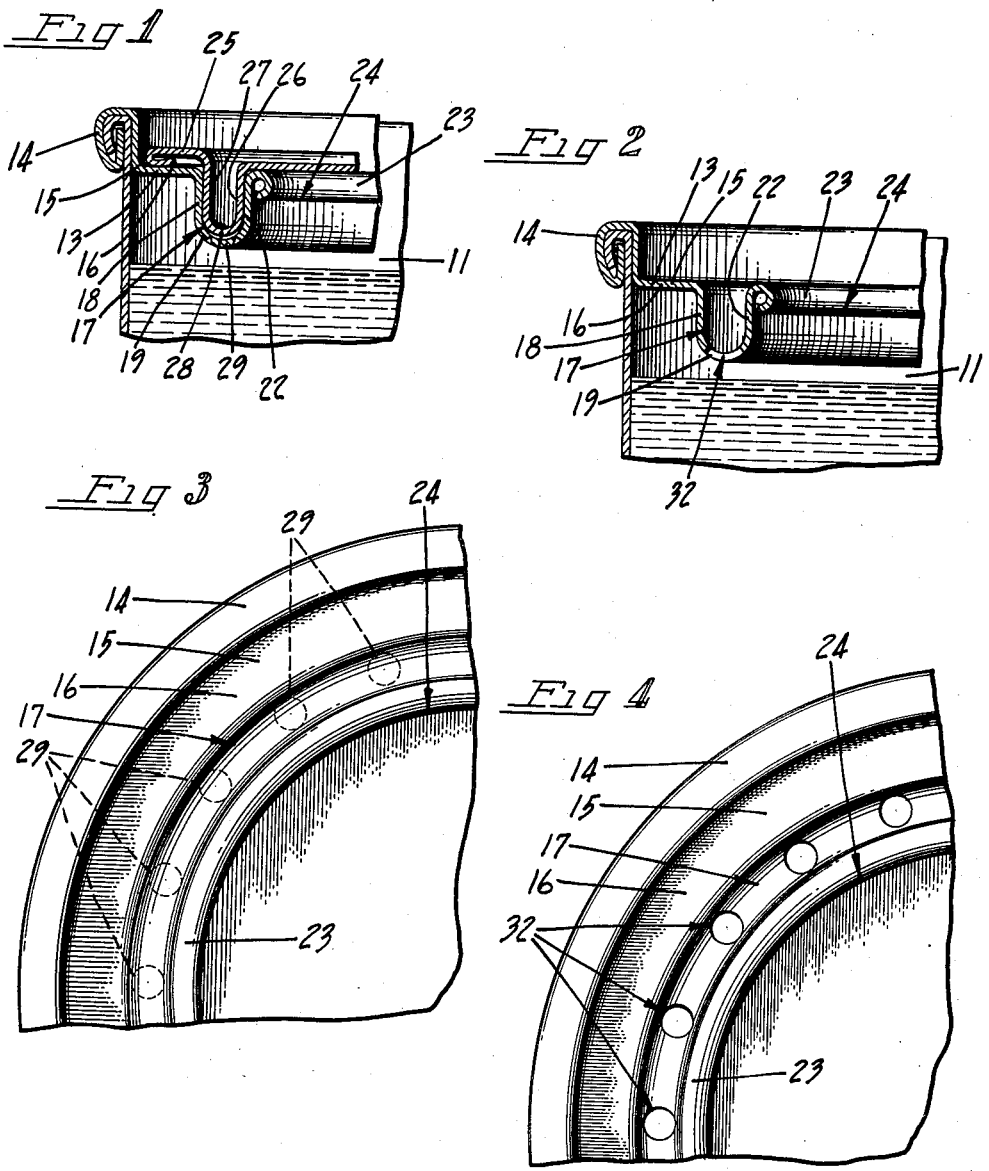

2,313,059

UNITED STATES PATENT OFFICE 2,313,059

CONTAINER

Richard D. Freeman, Westfield, N. J., assignor to American Can Company, New York, N. Y., a corporation of New Jersey Application February 15, 1941, Serial No. 379,125

1 Claim. (Cl. 220—90)

This invention relates to friction top containers for paint and the like, and has particular reference to the provision of a plurality of weakened or scored sections in the channel of a container friction ring, which sections upon being perforated, providing openings for draining paints and other such liquids from the channel into the container interior.

The invention contemplates the provision of a friction top paint can having a series of spaced scored or weakened areas formed in the channel of a double tight friction ring during its manufacture, which weakened areas while intact providing a full multiple friction wall feature desirable in such type of can to insure a tightly fitted and leak-proof friction plug closure which will withstand rough handling as during shipment. The weakened areas are exposed at the initial opening of the can by removal of its friction plug and may at the discretion of the ultimate consumer, be punctured or perforated to remove all or part of the scored areas to thereby produce a desired number of openings in the lowermost region of the channel. Such openings serve to permit paint or other similar materials accumulating in the channel to flow back into the can. The inner edge of the ring in the instant improved can may thereafter serve as a brush wiping element for removing excess paint from the brush without interfering with subsequent reclosing.

An object of the invention is the provision of a friction top paint can having a double tight friction ring and a friction plug cover fitted therein to provide a durable construction serving to securely seal the container contents against any possible leakage. To this end the channel of the friction ring is provided with a plurality of spaced circular scored or weakened areas which while not affecting with the application of the cover in sealing position, will upon being punched or pressed out after the can is initially opened, render the can adaptable for draining into its interior any contents trapped within the channel of its friction ring.

A further object of the invention is to provide a friction top can of the character described wherein the channel of the double tight friction ring is constructed with a plurality of spaced scored areas which may be punched out after the can is opened, to produce a series of drainage openings in such channel, which openings will allow paint or similar material that would otherwise permanently lodge therein to flow back into the can, thus avoiding difficulty in effecting a proper reclosure of the can.

Numerous other objects and advantages of the invention will be apparent as it is better understood from the following description, which, taken in connection with the accompanying drawing, discloses a preferred embodiment thereof.

Referring to the drawing:

Figure 1 is a fragmentary view in vertical section of a filled container embodying the invention and showing the same in fully closed position, such a container including an imperforate channel constituting a part of a multiple friction type ring;

Fig. 2 is a view similar to Fig. 1 and showing the channel of an opened container in perforated condition;

Fig. 3 is an enlarged plan view of the container after its plug cover has been removed and showing imperforate circular scored or weakened areas in the channel prior to being punched out; and Fig. 4 is a view similar to Fig. 3 showing the openings produced in the channel by the removal of the scored areas.

As a preferred embodiment of the invention there is shown in the drawing a can or container comprising a cylindrical can body 11 which may have the usual type of bottom end member and a friction ring 13. The bottom as well as the ring 13 may be secured to the body in any suitable manner as by double seams, the seam for the friction ring being shown in the drawing at 14.

The friction ring 13 is preferably of the double tight variety and is formed with the usual countersink 15. The inner vertical wall of the double seam 14 merges into a horizontal wall 16 and thence into an annular U-shaped channel 17. Such a channel has an outer vertical friction wall 18 depending from the horizontal wall, merging at its lower end into an annular arcuate section 19 and thence into a substantially parallel inner friction wall 22 which finally terminates in an inwardly disposed annular curl 23. This curl surrounds and defines a filling and discharge opening 24 of the can.

The can is closed by a friction plug or cover 25 which is insertable into the friction ring channel 17 to seal the can in the usual manner (Fig. 1). The plug has the conventional spaced vertical inner and outer friction walls 26, 27 joined by an annular curved wall or section 28. The walls 26, 27 cooperate with the friction ring walls 18, 22 to produce a multiple friction seal.

The arcuate bottom section 19 of the channel 17 has a plurality of circular weakened areas 29 formed at spaced intervals (Figs. 1 and 3). These weakened areas may be scored directly in the upper surface of the channel 17 or on the inner arcuate surface of the section 19 thereof as illustrated. When the latter location is employed it is desirable that the location of each weakened area is visible when viewed from the top of an opened container.

When the can is opened by an ultimate consumer in the usual manner by removal of the friction plug cover 25, the weakened areas 29 in the friction ring channel are thus exposed. It is then optional for the consumer to use the contents directly from the can as received or to perforate the channel of the friction ring to produce the desired number of drain openings therein.

The provision of the scored or weakened areas 29 heretofore described facilitates the formation of such drain openings as at 32 (Figs. 2 and 4), as the weakened sections may easily be punched or pushed out of the lower channel region by use of any blunt instrument.

The curl 23 of the perforated channel thereafter serves as a convenient brush wiper or lip for the removal of excess paint from a brush and permits any paint that flows into the channel to drain back into the can (Fig. 2).

The openings 32 in the channel 17 may have the effect of partially reducing the multiple sealing effect of the sealing friction walls 18 and 22, but said walls of the ring still remain effective as sealing surfaces. The container before opening, however, is fully sealed by the described imperforate multiple wall construction at the time when such a full seal is most desirable. After opening and after the drainage holes are formed the outer single wall seal 18 alone is adequate since the paint is then usually quickly consumed. The cover 25 may be reinserted into the perforated channel and satisfactorily seals any remaining unused contents within the can for the relatively short period usually incurred.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A friction top container for paint and the like, comprising a container body, a friction ring seamed to the upper end of said body including spaced inner and outer friction walls connected by an annular inwardly curved arcuate wall section to define a channel of substantial width throughout, a plurality of imperforate removable areas set off by score lines in said curved connecting wall section, and a friction plug cover insertable into said friction ring channel and having an annular groove defined by inner and outer spaced friction walls, said cover walls respectively engaging the walls of said friction ring as a reenforced double friction tight closure to seal the container contents in a double friction seal and to protect said removable areas, said areas being adapted to be punched out of said arcuate section following the initial opening of the container to provide drainage openings of material size in said channel for returning by gravity to the container interior residual paint lodged in said channel.

RICHARD D. FREEMAN.